United States Patent [19]

Juret et al.

[11] Patent Number: 5,013,255

[45] Date of Patent: May 7, 1991

[54] CARD CONNECTOR AND PRODUCTION METHOD

[75] Inventors: Bernard Juret, Dole; Alain Janniere, Paris, both of France

[73] Assignee: ITT Composants et Instruments, Bagneux, France

[21] Appl. No.: 423,911

[22] Filed: Oct. 19, 1989

[30] Foreign Application Priority Data

Oct. 26, 1988 [FR] France ................................ 88 13988

[51] Int. Cl.5 ............................................. H01R 13/15
[52] U.S. Cl. .................................. 439/260; 439/630; 439/188
[58] Field of Search ................ 439/188, 489, 59, 325, 439/326, 327, 328, 329, 629, 630, 631, 636, 260; 235/441, 482, 483, 486; 200/51.1

[56] References Cited

U.S. PATENT DOCUMENTS

| 3,795,888 | 3/1974 | Nardo et al. | 439/630 |
|---|---|---|---|
| 4,084,847 | 4/1978 | Georgopulos | 439/326 |
| 4,530,557 | 7/1985 | Katsube et al. | 439/325 |
| 4,900,273 | 2/1990 | Pernet | 439/630 |

FOREIGN PATENT DOCUMENTS

| 0105083 | 5/1983 | European Pat. Off. . |
|---|---|---|
| 8529580 | 2/1986 | Fed. Rep. of Germany . |
| 3612576 | 6/1987 | Fed. Rep. of Germany . |
| 2607291 | 11/1986 | France . |

Primary Examiner—Neil Abrams
Assistant Examiner—Khiem Nguyen
Attorney, Agent, or Firm—Thomas L. Peterson

[57] ABSTRACT

A connector is described with a slot for receiving an electronic memory card and with multiple terminals (32, 34 in FIG. 1) that engage card contact regions, which can be constructed at low cost. The multiple terminals are produced by cutting a strip of sheet metal to form a row of parallel elongated terminals (32 in FIG. 11) that have mount portions (40) lying between first and second terminal end portions (31, 38), and with the second end portions held on a carrier strip (204). A frame (22) of the housing is molded around the mount portions of the terminals, and thereafter the terminals are cut free of the carrier strip. A microcontact device (44 in FIG. 2) for detecting full insertion of the card, includes a first contact with a bent zone (64) projecting a distance forwardly into the slot, to be rearwardly deflected by the leading edge of a card, out of engagement with a second contact. The upper slot walls have a downwardly-facing concave portion (106 in FIG. 6) lying over terminals that contact the card contact regions, to facilitate insertion of the card.

8 Claims, 7 Drawing Sheets

FIG.7

CARD CONNECTOR AND PRODUCTION METHOD

BACKGROUND OF THE INVENTION

An electrical connector for electronic-memory cards includes a housing with a slot into which the card can be inserted, multiple terminals in the housing that engage regions on the face of the card as it becomes fully inserted, and a microcontact device for detecting full insertion of the card. The connector may include numerous terminals for engaging the card contact regions and a pair of contacts for engaging the leading edge of the card to detect its full insertion. It can be expensive to reliably mount all of the terminals and contacts on the housing. A connector and method for constructing it which enabled low cost mounting of the terminals and contacts, would be of considerable value.

It is desirable that the device for detecting full insertion of the card be highly reliable, in allowing the leading edge of the contact to open or close a switch. It is important that the leading edge of the card not ride over or under the detecting device it engages, and that the switch contact reliably open or close the switch. It is also important that the leauing edge of the card reliably ride over a large number of terminals in the connector as the card is inserted. An electrical card connector which could be constructed at low cost and assure reliable detection of the full insertion of the card while reliably allowing the card to ride over the terminals that contact its card contact regions, also would be of considerable value.

SUMMARY OF THE INVENTION

In accordance with one embodiment of the present invention, a card connector and production method are provided, which enable production of a low cost and reliable card connector. The connector can include a housing with upper and lower frames forming a slot between them, and multiple terminals in the slot that engage contact regions on a face of the card. The terminals can be constructed by forming cuts in a strip of sheet metal to form at least one row of parallel terminals that each have a card-contacting free end portion, a second inner end portion, and a mount portion between them. The strip of sheet metal also forms a carrier strip that connects the second end portions. The lower frame of the housing is molded around the mount portions of the terminals, while the terminals are still held together by the carrier strip. Only after the frame is molded, are the terminals separated from the carrier strip. A resultant connector with multiple terminals having mount portions molded in the lower frame, holds the terminals in a low cost and reliable manner.

A microcontact device for detecting full insertion of the card includes a detection contact and an output contact lying near the rear end of the slot, with the detection contact deflected by the leading edge of a card out of engagement with the other contact. The detection contact has a bent zone projecting forwardly into the slot so it is deflected by the leading edge of the card. The output contact has a lug that can abut a frame location to limit its rearward deflection.

The upper walls of the slot include a concave portion that lies over curved ends of the terminals to facilitate downward deflection of the terminal ends as the card is inserted.

The novel features of the invention are set forth with particularity in the appended claims. The invention will be best understood from the following description when read in conjunction with the accompanying drawings.

BRIEF DESCRIPTION OF THE DRAWINGS

FIG. 1 is a perspective exploded view of an electrical connector constructed in accordance with the present invention and showing a portion of a card that it can connect to.

DESCRIPTION OF THE PREFERRED EMBODIMENT

Figure 1:
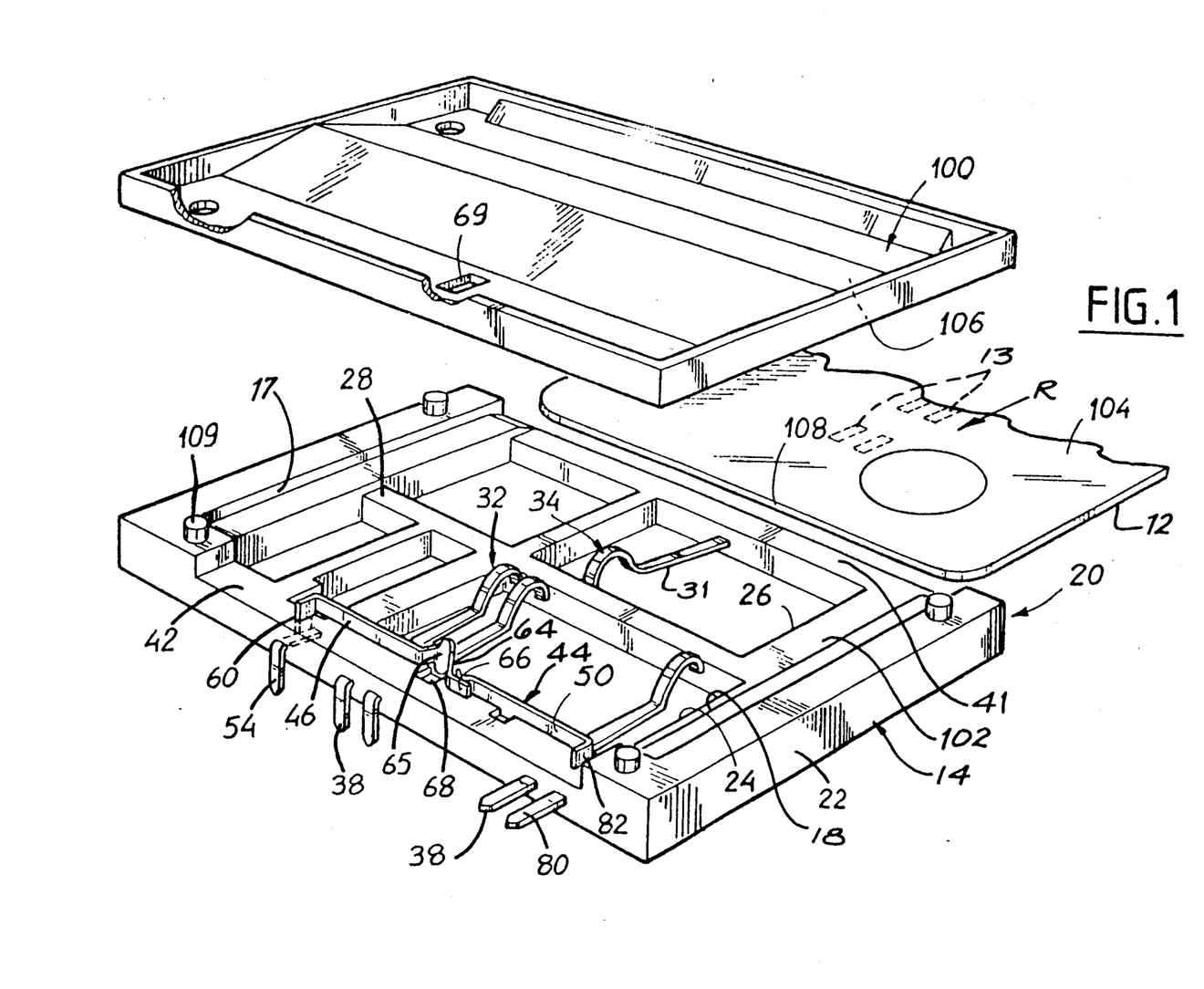

FIG. 1 illustrates an electrical connector 20 which can receive an electronic memory card 104 which has a lower face 12 with multiple contact regions 13. The connector includes a housing 14 with upper and lower frames 100, 22 that are held by bosses 109 and that form a slot 102 between them. The slot has laterally spaced opposite sides 17, 18 and is slightly wider than the card. Two rows of terminals 32, 34 lie in the housing, and are positioned to engage the contact regions 13 of the card, as the card is inserted in a rearward direction R into the front 41 of the slot. A microcontact device 44 lying at the rear 42 of the slot, detects the leading edge 108 of the card, to determine when the card has been fully inserted. The terminals and contacts are connected to circuitry of a read/write apparatus (not shown) that can read information stored in the card and write new information into the card.

Figure 6:
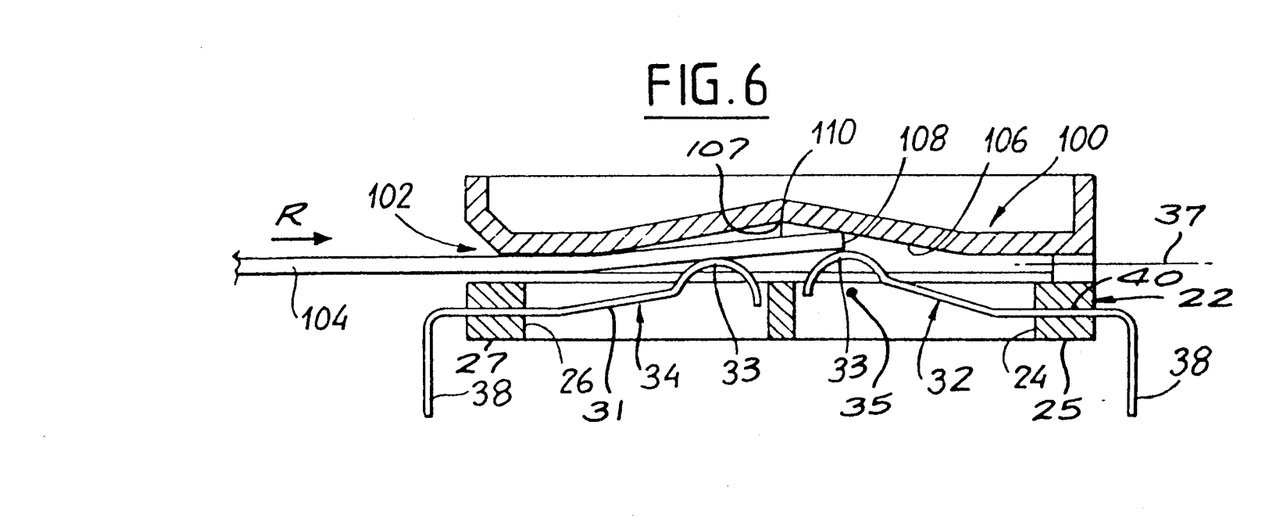
FIG. 6 is sectional view of the connector of FIG. 1, showing a card in a partially inserted position.

Each terminal 32, 34 has a first or inner end portion 31 extending largely parallel to the insertion direction R and lying primarily at a lower side of the slot which is closer to the lower wall 28 of the slot than the upper wall of the slot. As shown in FIG. 6, the inner or first terminal end portion 31 includes a curved end 33 that is curved above an axis 35 extending in a lateral direction that is perpendicular to the rearward insertion direction R and parallel to an imaginary plane 37 passing through the narrow front and rear portions of the card-receiving slot. Each terminal such as 32 includes an outer second end portion 38, and also includes a mount portion 40 that lies between the first and second end portions 31, 38. The mount portion 40 extends through a rearward part 25 of the housing lower frame 22. The lower frame has recesses or apertures 24, 26 in which lie much of the terminal first end portions 31. The frame also has laterally-extending rearward and forward ends 25, 27 in which the mount portions 40 of the terminals are mounted. The ends 25, 27 each have a length in a forward-rearward direction that is less than the length of said terminal free first end portions 31. As will be discussed below, molding the mount portions of the terminals into the lower frame results in the terminals being held in place very securely in a low cost manner, which enables mounting of a large number of terminals in a low cost manner.

Figures 2, 3, 4:
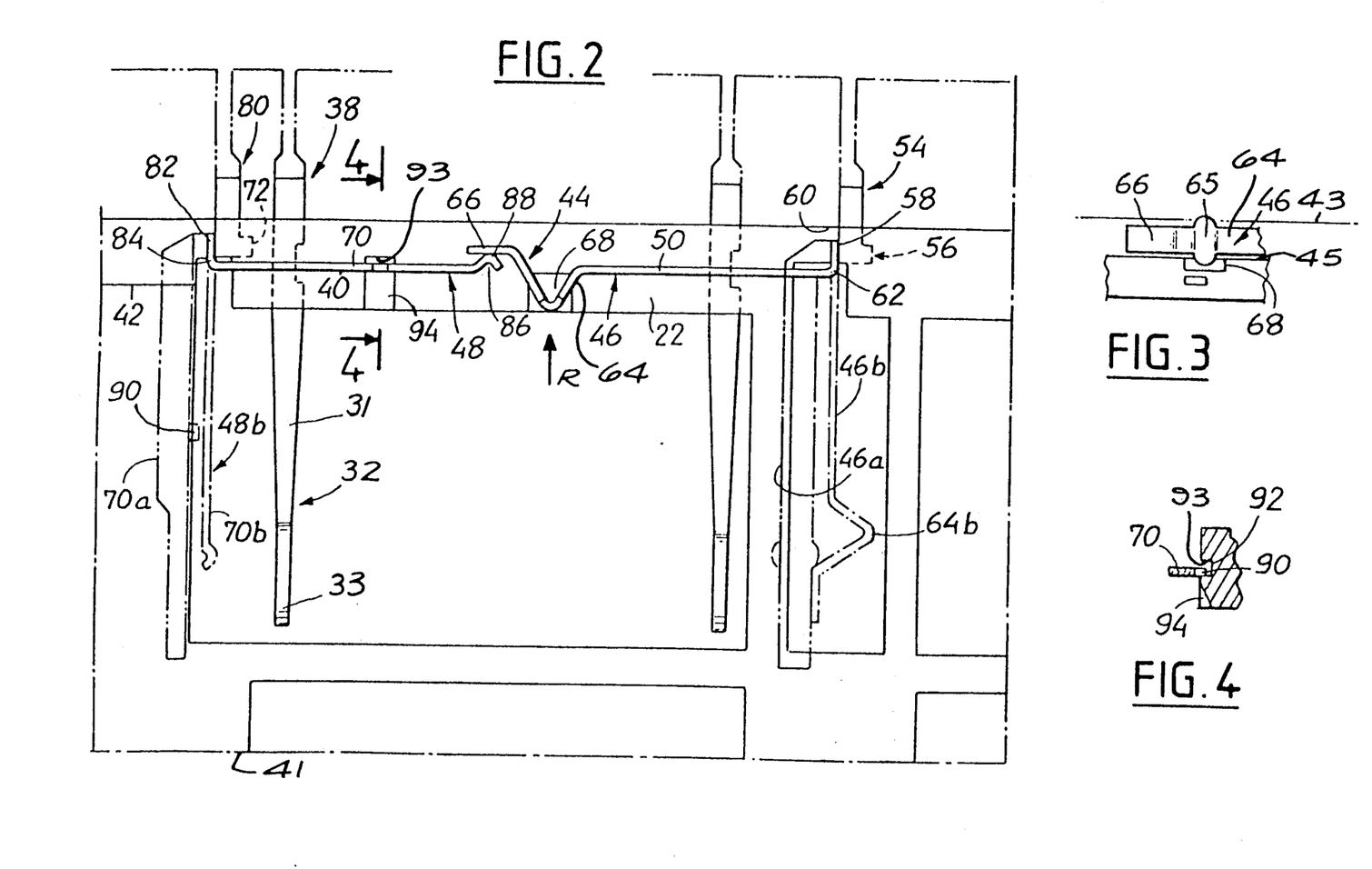
FIG. 2 is a plan view of a portion of the connector of FIG. 1 showing the microcontact device thereof.
FIG. 3 is a front view of a portion of the microcontact device of FIG. 2.
FIG. 4 is a view taken on the line 4—4 of FIG. 2.
Figure 5:
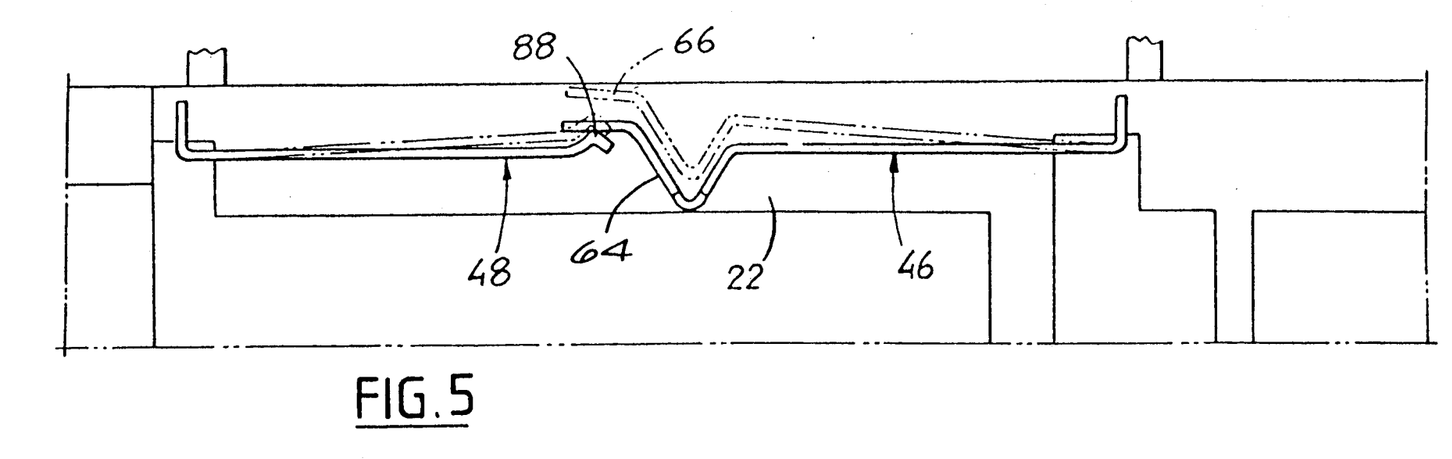
FIG. 5 is a view of a portion of the microcontact device of FIG. 2, showing it in two different configurations.

FIG. 2 illustrates details of the microcontact device 44 which lies at the rear of the card-receiving slot and which detects full reception of the card in the slot. The microcontact device includes a detection contact 46 and an output contact 48. Each contact has a mount portion 72, 56 mounted on the lower frame of the housing of opposite sides of the slot rear end, and a free end portion 70, 50 lying near the slot rear end. The detection contact 46 has a bent zone 64 with a convex side facing the slot front end 41 so that bent zone projects towards the front slot end to engage the leading edge of the card as it is fully inserted. The detection contact 46 also has an end tab 66 on a side of the bent zone opposite the mount portion 56. The end tab 66 engages a free end 86 of the output contact. Before a card is inserted, the two contacts 46, 48 are engaged to close a circuit to indicate the card has not yet been received. As shown in FIG. 5, when the card is received, it depresses the bent zone 64 of the detection contact, so its end tab 66 moves out of contact with the free end 88 of the output contact, to open the circuit, to thereby indicate full insertion of the card.

As shown in FIG. 3, the bent zone 64 of the detection contact has a widened zone 65 at its frontmost location. The widened zone projects beyond the upper and lower sides 43, 45 of the slot, to prevent a slot from riding above or below a detection contact. The figure shows a recess 68 formed in the lower frame along which the widened zone can move. Another recess (69 in FIG. 1) lies in the upper frame.

To prevent excessive rearward movement of the output contact 48 (which could leave it in contact with the detection blade when the detection blade is deflected rearwardly) applicant provides a downwardly-projecting guide lug 90 (FIG. 4) on the output contact, which lies in a notch 92 formed at the lower frame. The rear of the notch forms a stop 93 that limits rearward movement of the output contact. FIG. 4 also shows a rearwardly-upwardly bevelled region 94 in the lower frame that facilitates bending the free end 70 of the output contact so its guide lug 90 can move into the notch 92 during manufacture of a connector.

FIG. 6 shows that the upper face of the slot walls includes a concave upper slot portion 106. The concave portion 106 is concave as viewed along a lateral direction as shown in FIG. 6. The top or deepest location 107 of the concave slot portion lies over a location substantially between the curved ends 33 of the two terminals 32, 34 that extend respectively in forward and rearward directions from their mount portions 40 where they are respectively mounted on the rearward and forward parts 25, 27 of the lower frame. During insertion of the card 104, the concave upper slot portion 106 can accommodate the leading edge of the card so it can ride over the curved ends of the terminals and begin depressing the terminals when the card is deflected further down as it approaches the rear of the slot. This facilitates the use of low cost terminals extending both in forward and rearward directions along the bottom of the slot.

Figure 7:
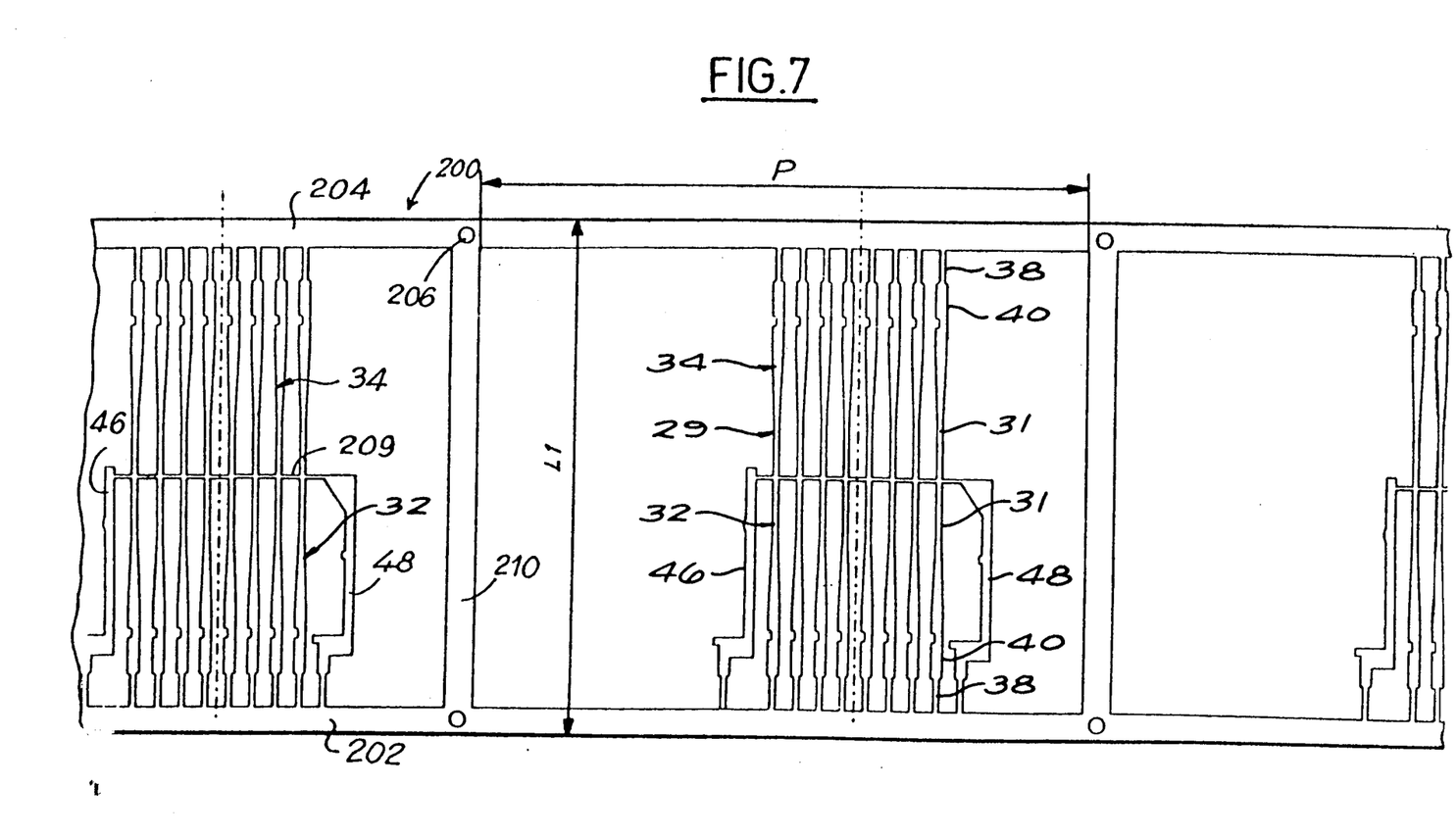
FIG. 7 is a simplified plan view of a strip of electrically conductive sheet metal with cuts therein, in accordance with a first step in a method of production of the connector of FIG. 1.

FIG. 7 illustrates a first step in the construction of the electrical connector, which includes forming long terminal strips 29 that will form the rearward and forward terminals 32, 34, and forming the contacts 46, 48, all from a strip or sheet 200 of sheet metal. Cuts are formed in the sheet metal to form the largely parallel terminals that each have a contacting first end portion 31, an inner second end portion 38 and a mount portion 40. A pair of carrier strips 202, 204 connect locations on the second end portions 38 of the terminals of a row. A joining zone 209 joins the first end portions of the two rows of terminals 32, 34 and the ends of the contacts 46, 48. Transverse strips 210 connect the carrier strips 202 and 204. Indexing holes 206 are used to locate the sheet metal.

Figure 8:
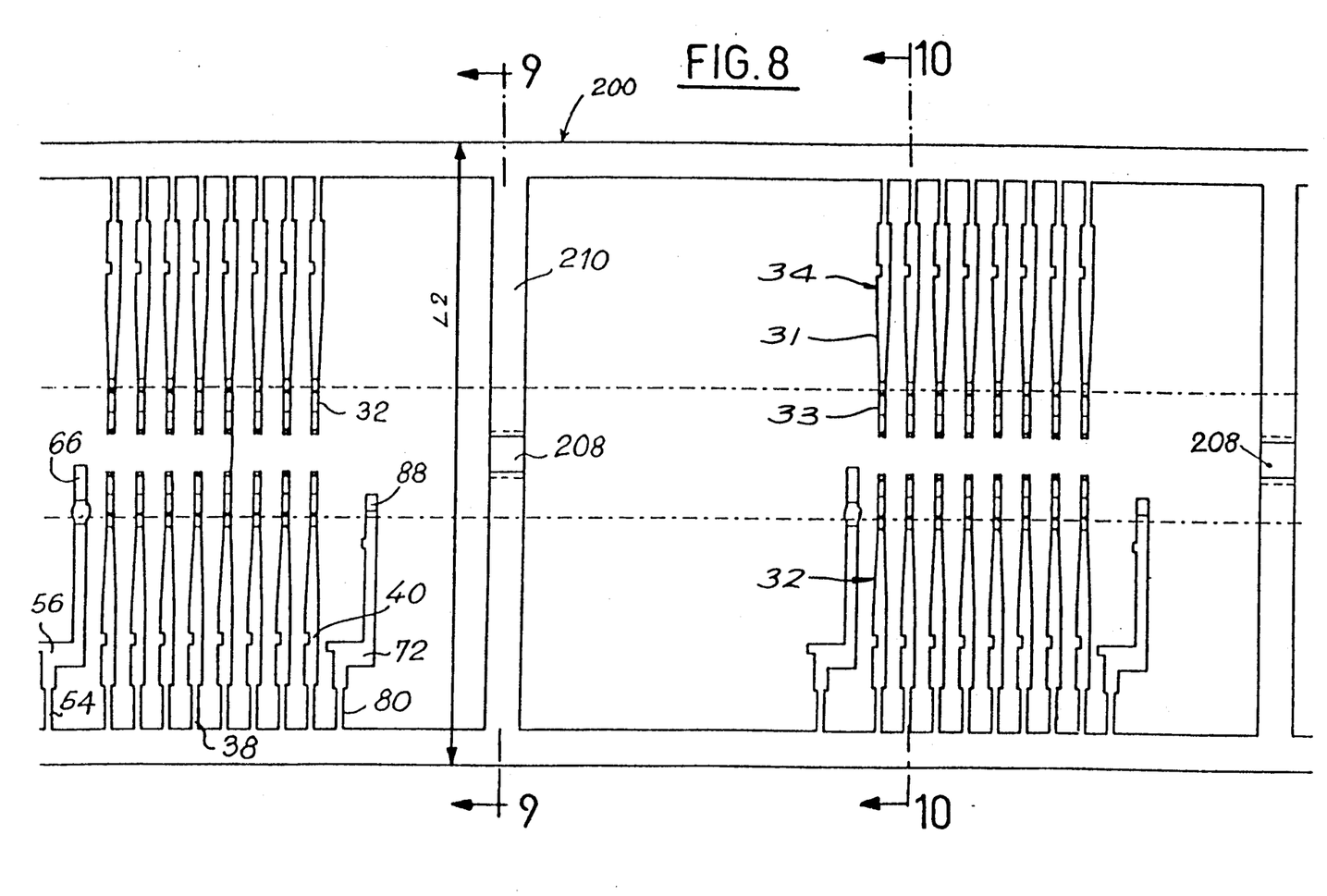
FIG. 8 is a view similar to that of FIG. 7, at a later step in the process after an additional cutting and bending steps.
Figure 9:
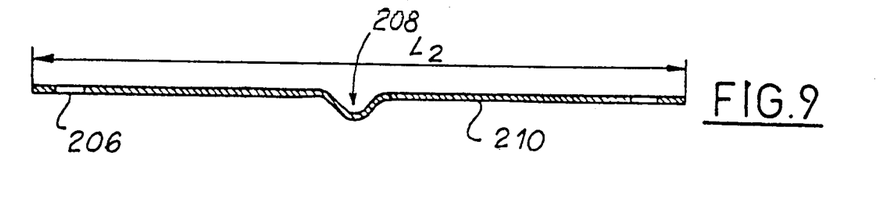
FIG. 9 is a sectional view taken on the line 9—9 of FIG. 8.
Figure 10:
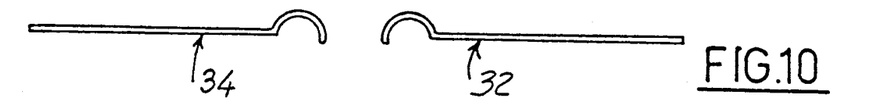
FIG. 10 is a sectional view taken on the line 10—10 of FIG. 8.

After the sheet of FIG. 7 is formed, production continues by cutting away the joining zone 209 to leave the strip in the configuration shown in FIG. 8. In FIG. 8, the first end portions 31 of the two rows of terminals have been separated from one another. The ends 33 of the terminals are bent to curved configurations. Since the adjacent inner tips of the two rows of terminals 32, 34 lie close to one another, the connecting strip is bent at a bent zone 208, also shown in FIG. 9, to bring the two rows of terminals 32, 34 slightly closer together.

Figure 11:
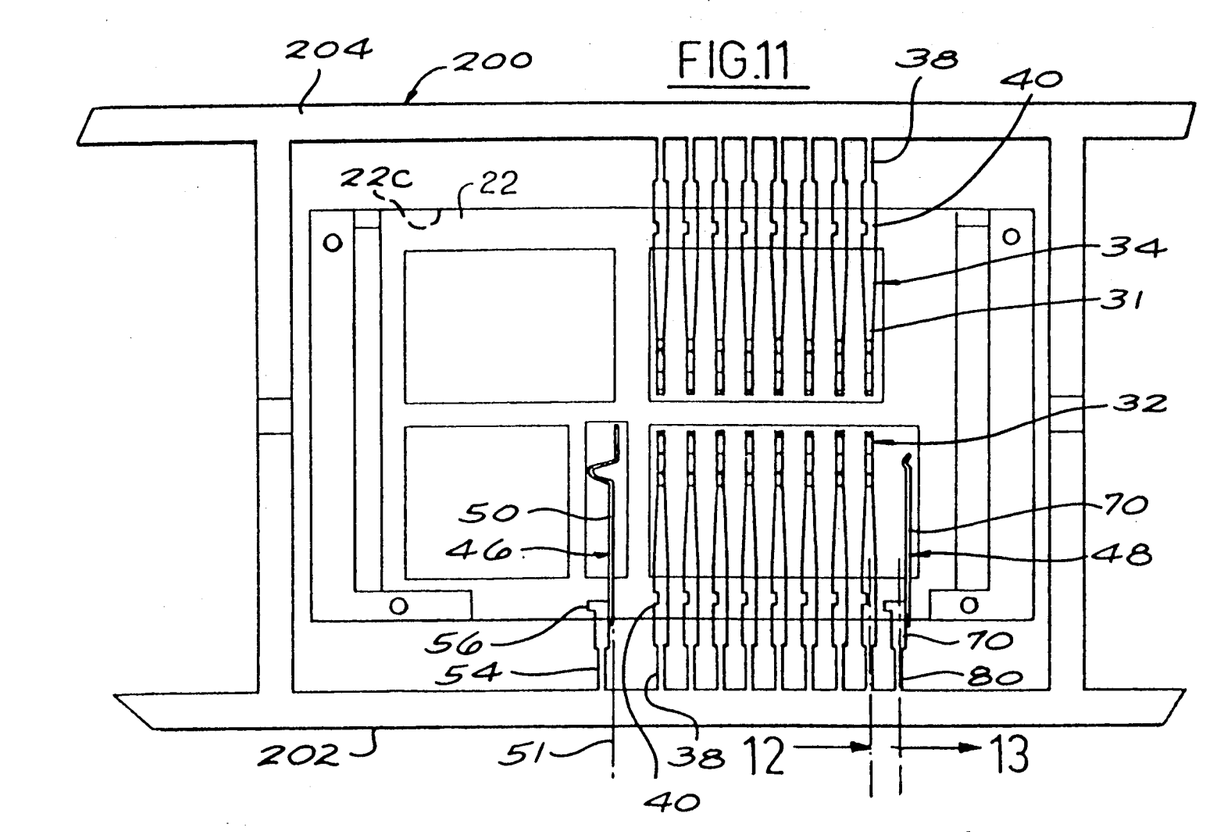
FIG. 11 is a view of the strip of FIG. 8 shown during a later step in the process, and also showing the lower frame of FIG. 1.

FIG. 11 shows a next step, which includes bending the contact first or free end portions 50, 70 about a first bend line such as indicated at 51 so the sheet metal of the free end portions 50, 70 lie in vertical planes when the contact mounting portions 56, 72 lie in horizontal planes. (FIG. 2 shows the initial contact configurations at 48b, 70b after the first bending.) Next, the sheet metal 200 shown in FIG. 11 is placed in a lower frame mold cavity indicated at 22c, which has the shape of the lower frame shown at 22. Non-conductive plastic material is injected into the cavity to form the lower frame 22, with the mount portions 40 of the terminals and the mounting portions 56, 72 of the contacts molded into the frame. The positions of the terminals and contacts is closely controlled by the fact that they are held to the carrier strips 202, 204 during the molding operation. After the molding operation, the second end portions 38 of the terminals and the free second ends 54, 80 of the contacts are severed from the carrier strips.

Figure 12:
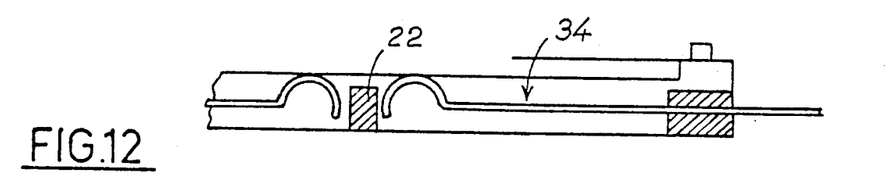
FIG. 12 is a partial sectional view taken on the line 12—12 of FIG. 11.
Figure 13:
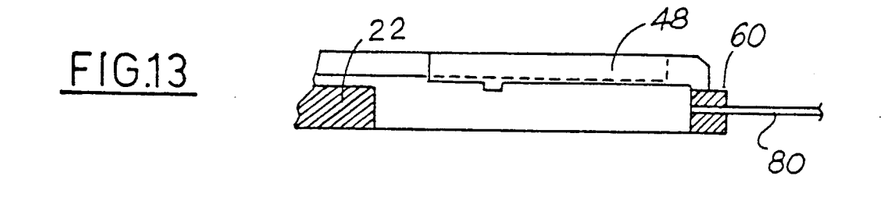
FIG. 13 is a partial sectional view taken on the line 13—13 of FIG. 11.
Figure 14:
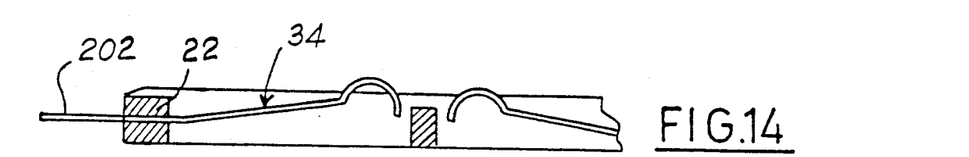
FIG. 14 is a view similar to that of FIG. 12, showing the terminals after an additional bending operation.
Figure 15:
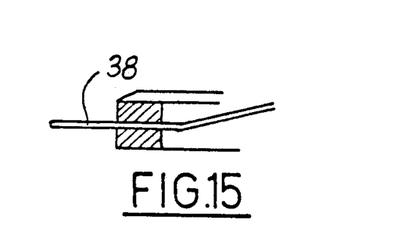
FIG. 15 is a view of a portion of the apparatus of FIG. 14, after separating the terminal from a carrier strip.
Figure 16:
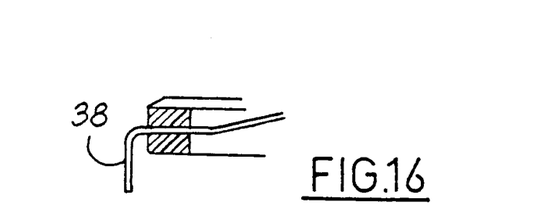
FIG. 16 is a view similar to that of FIG. 15, after an additional bending operation.
Figure 17:
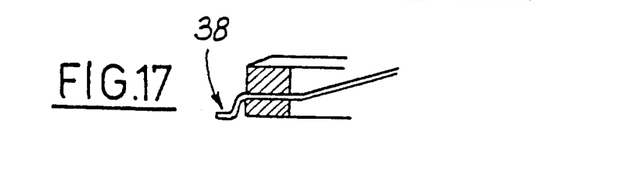
FIG. 17 is a view similar to that of FIG. 16, after an additional bending operation.

A next step is to bend the contact free end portions 50, 70 about second bend lines or axes at 62, 84 (FIG. 2) approximately 90° from the configurations 46b, 48b, to the orientations 46, 48 wherein the contact free end portions extend towards one another. As mentioned above, the lug 90 (FIG. 4) on the free end portion 70 of the output blade is trapped in a notch 92, and as shown in FIG. 2, the free end of the detection blade lies behind and is biased forwardly against the output blade. After the contacts have been bent to their final configurations, the terminals are bent upwardly from the configuration shown in FIG. 12, to the configuration shown in FIG. 14. As shown in FIGS. 16 and 17, the second ends 38 of the terminals are bent to facilitate their connection to a read/write device.

Thus, the invention provides a low cost and reliable card connector which can receive and connect to contact regions on a card. The multiple terminals in the connector are formed from sheet metal and are molded into a lower frame of the connector. During the molding operation, ends of the terminals are held together by a carrier strip. The process allows a large number of terminals to be easily formed and mounted on the connector housing in a low cost and highly reliable manner. A microcontact device for sensing full insertion of the card, includes a pair of contacts with free ends extending in lateral direction along the rear of the card-receiving slot, with a detector contact having a bent zone that projects forwardly and that has a widened zone, with rearward deflection of the bent zone moving the detection contact out of engagement with an output contact. With the terminals mounted to the lower frame of the housing, the upper frame of the housing forms a slot wall with a concave portion over the free ends of the terminals to facilitate insertion of a card so it deflects the terminals downwardly.

While the terms "upper" and "lower" have been used herein to describe orientations shown in the figures, the connector can be used in any orientation and the terms only describe relative positions.

Although particular embodiments of the invention have been described and illustrated herein, it is recognized that modifications and variations may readily occur to those skilled in the art, and consequently, it is intended that the claims be interpreted to cover such modifications and equivalents.

We claim:

1. An electrical connector for receiving an electronic memory card having a plurality of card contact regions, that is inserted in a predetermined rearward direction into the connector, comprising:

a housing forming a slot having forward and rearward ends for receiving said card;

a plurality of terminals mounted in said housing and positioned to engage said card contact regions as said card is inserted;

a microcontact device for detecting full insertion of said card, comprising a detection contact and an output contact, each contact having a mount portion mounted on said housing, said contacts having free ends lying near said slot rear end so at least one of said free ends can be deflected by said card between a first configuration wherein said free ends engage each other and a second configuration wherein said free ends are out of engagement with each other;

said free end portion of said detection contact has a bent zone that projects toward said front slot end, said detection contact free end portion also having an end tab lying behind and in contact with the free end of said output contact, said bent zone lying in the path of said card to be deflected by said card during its insertion, and said housing having a stop that engages said output contact to limit its rearward movement.

2. The connector described in claim 1 wherein:
   said terminals have free first end portions for engaging said card, second end portions, and mount portions between said terminal end portions;
   said housing comprises upper and lower frames forming said slot between them, said lower frame being a molded plastic part supporting said mount portions of said terminals and of said detection and output contacts, said mount portions of said terminals and contacts being molded into said lower frame.

3. The connector described in claim 1 wherein:
   most of said detection contact free end portion has a substantially constant width that is less than the height of said slot, said bent zone of said detection contact has a widened zone that is wider than the widest card that can fit through said slot, and said lower frame has a recess that receives said widened part.

4. The connector described in claim 1 wherein:
   said housing has upper and lower frames forming said slot between them, said slot having upper and lower sides, said terminals include forward and rearward terminals that have free ends lying in a region of said slot and biased toward said upper slot side to press upwardly against a card in said slot, said forward and rearward terminals having end portions mounted respectively at forward and rearward parts of said housing and having free ends extending toward each other;
   said upper frame has a concave slot portion facing said lower frame as seen in a side view of said slot, with the top of said concave slot portion lying approximately between said free ends of said forward and rearward terminals, to facilitate bending of said terminal free ends by said card.

5. An electrical connector for receiving an electronic memory card having a predetermined width and thickness and upper and lower faces separated by said thickness, said card having a plurality of card contact regions on its lower face, wherein the card is inserted in a predetermined rearward insertion direction into the connector, comprising:

a housing having slot walls forming a slot with forward and rearward ends for receiving said card, said slot having upper and lower walls spaced apart by slightly more than the thickness of said card and having opposite side walls spaced apart in a lateral direction by slightly more than the width of said card;

a plurality of terminals mounted in said housing and positioned to engage said card contact regions as said card in inserted into said slot, said terminals each having terminal inner end portions extending largely parallel to said insertion direction and lying primarily at a lower side of said slot, and said terminal inner end portions have curved ends that are curved about axes extending parallel to said lateral direction;

said slot has narrow front and rear ends and said upper slot wall has a downwardly-facing concave portion that is concave as viewed along said lateral direction and that lies between said forward and rearward slot ends and over said curved ends of said terminals.

6. The connector described in claim 5 wherein:
said plurality of terminals includes a first plurality of terminals having mount portions mounted on said housing and lying rearward of the curved ends of the first terminals and a second plurality of terminals having mount portions mounted on said housing with said mount portions of said second terminals lying forward of the curved ends of said second terminals and with the curved ends of said second terminals lying forward of the curved ends of said first terminals;
said concave portion of said upper slot wall has a deepest location, where it lies furthest from said bottom wall, that lies over a location substantially between said curved ends of said first and second terminals.

7. An electrical connector for receiving an electronic memory card having a plurality of card contact regions, that is inserted in a predetermined rearward direction into the connector comprising:
- a housing which includes upper and lower frames forming a slot between them for receiving said card, said slot having forward and rearward ends, and said slot and housing each having opposite sides;
- a row of substantially parallel terminals mounted in said housing and positioned to engage said card contact regions when said card is inserted; and
- a microcontact device for detecting full insertion of said card;

said terminals have elongated first end portions with curved outer ends for contacting said card contact regions, second end portions, and mount portions lying between said first and second end portions;
said lower frame being molded of plastic material and having a narrow end portion extending between said opposite sides of said housing, said terminal mount portions being molded into said narrow end portion of said lower frame;
said microcontact device includes a detection contact and an output contact, each contact having first and second end portions and a mount portion between them, said mount portion being molded into said lower frame, said first end portions of said contacts lying near said slot rear end and with one of them being deflectable by said card between a first configuration wherein said first contact ends engage each other and a second configuration wherein said free ends are out of engagement with each other;
said slot lies substantially in a plane; and
each of said contacts is formed of sheet metal, said mount portions each lie in a plane that is substantially parallel to said slot, each contact includes a first bend of substantially 90° about an axis extending substantially parallel to said rearward direction, and a second bend of substantially 90° about an axis extending substantially normal to the plane of said slot.

8. The connector described in claim 7 wherein:
said output contact has a downwardly-projecting lug, said lower frame has a notch which receives said lug, and said frame has a rearwardly-upwardly beveled region forward of said notch for guiding said lug into said notch.

* * * * *